Jan. 22, 1929.　　　　　　　　　　　1,699,603
J. G. BLUNT
LOCOMOTIVE TRUCK
Filed Feb. 21, 1925　　　2 Sheets-Sheet 1
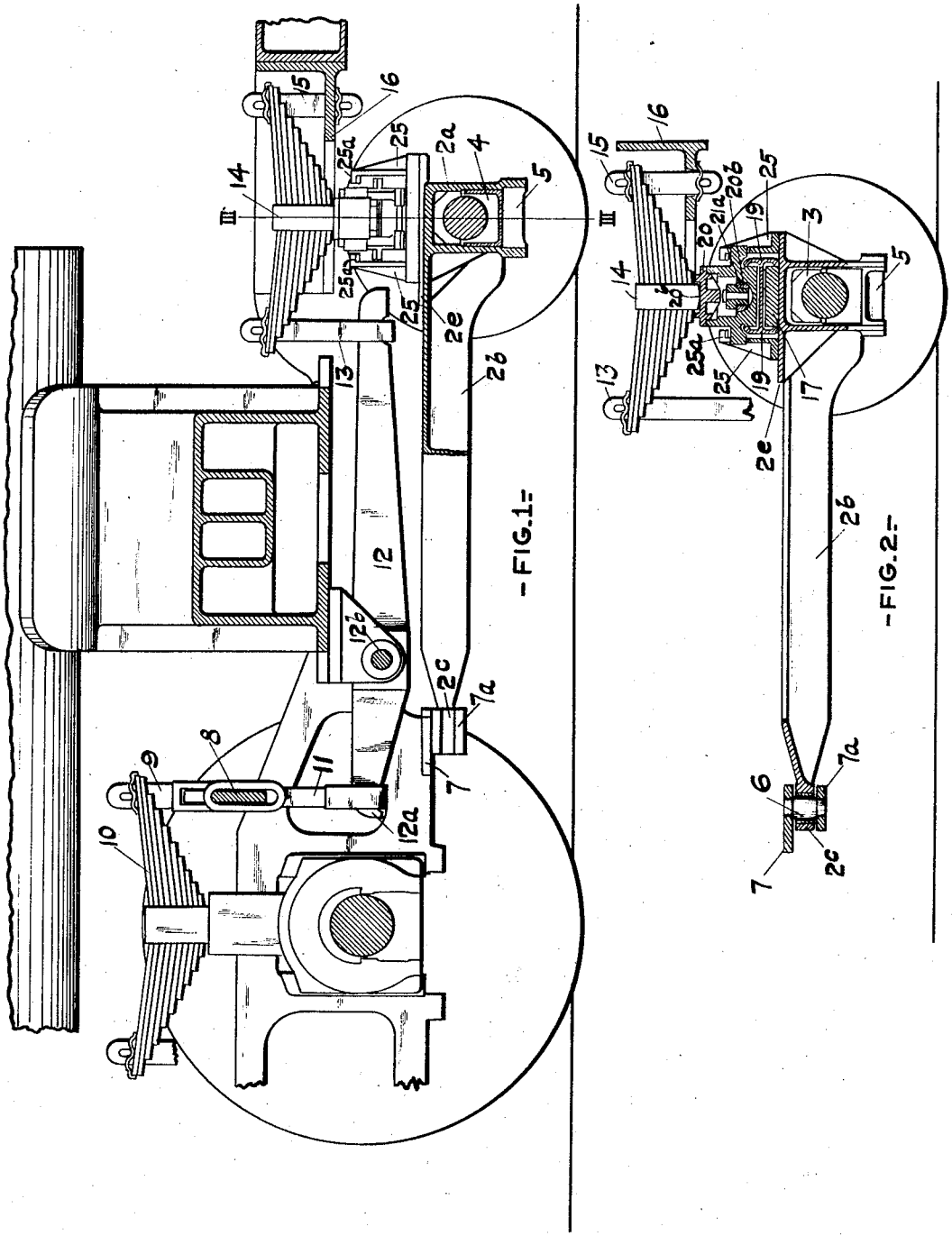
INVENTOR
James G. Blunt
BY
Clarence Kerr
ATTORNEY Jan. 22, 1929.
J. G. BLUNT
1,699,603
LOCOMOTIVE TRUCK
Filed Feb. 21, 1925
2 Sheets-Sheet 2
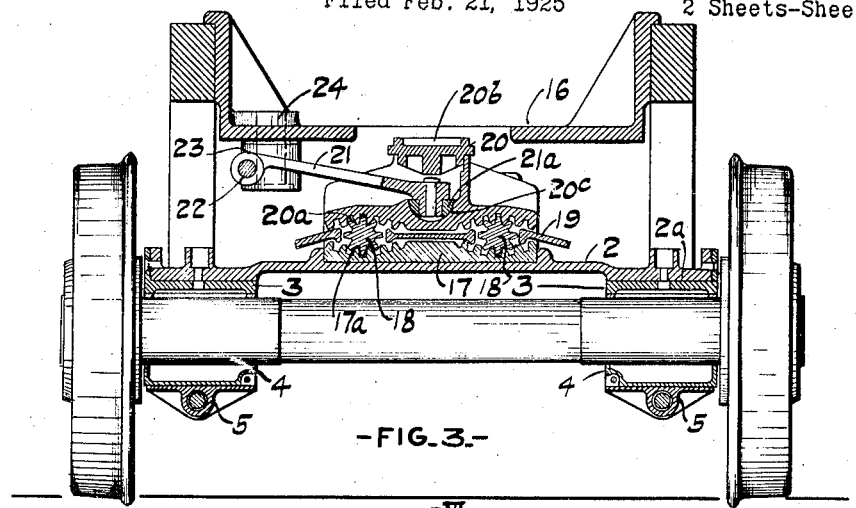
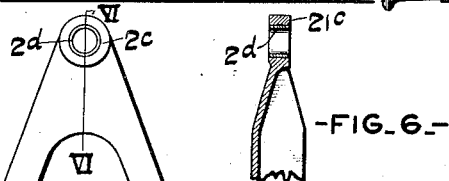
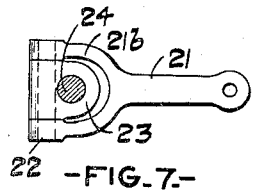
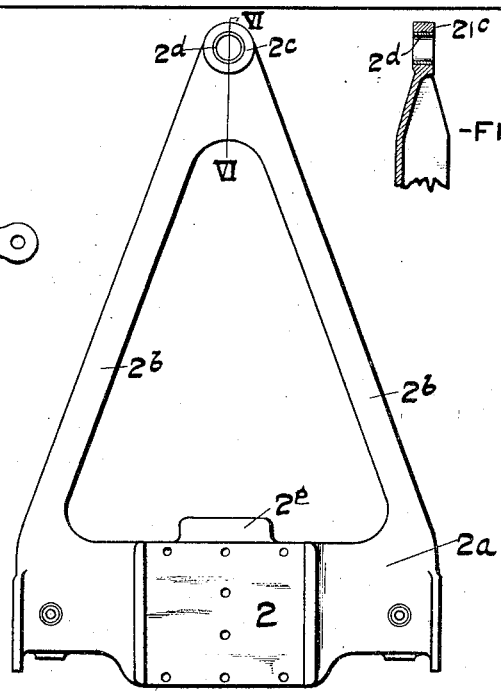
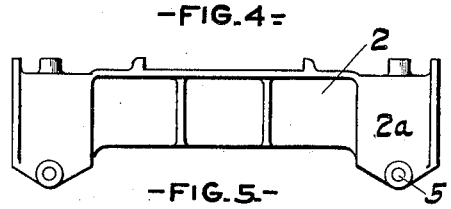
INVENTOR
James G. Blunt
BY
Clarence D. Kerr
ATTORNEY Patented Jan. 22, 1929.

1,699,603

UNITED STATES PATENT OFFICE.

JAMES G. BLUNT, OF SCHENECTADY, NEW YORK.

LOCOMOTIVE TRUCK.

Application filed February 21, 1925. Serial No. 10,764.

My invention relates to locomotive trucks of the two-wheel type which have journal bearings disposed between the truck wheels, and has for its object elimination of wear and decrease in maintenance costs by replacing the pedestals which usually form guides for the journal boxes by a novel mechanism later to be described.

A further object of my invention is to transmit the spring equalized loads from the locomotive frame to the truck by means which provides for universal movement in the connecting and lateral resistance mechanisms throughout the lateral and radial movements of the truck and angular positions assumed by the truck axle in a vertical plane. My invention also relates to various features which I shall hereinafter describe and claim.
The improvement claimed is hereinafter fully set forth.

In the accompanying drawings: Figure 1 is a view, partly in side elevation, and partly in section, of the forward portion of a locomotive embodying the invention; Fig. 2, a section taken in the vertical, central plane of the leading truck; Fig. 3, a vertical transverse section, taken on the line III—III of Fig. 1; Fig. 4, a plan view of the truck frame; Fig. 5, a front elevation thereof; Fig. 6, a vertical central section of the rear end of the frame, taken on the line VI—VI of Fig. 4; and, Fig. 7, a plan view of the link connecting the lateral resistance device to the frame of the locomotive.

In the practice of the invention, referring descriptively to the specific embodiment thereof which is herein exemplified:

The frame 2 of a locomotive leading truck is preferably cast as an integral structure, and forms in effect a beam carrying the load imposed by the spring on the center line of the truck to the truck journals housed in each lateral extremity 2ª thereof. Each housing 2ª has journal bearings 3, lubricant cellars 4, and thimbles or spreaders 5 which reinforce the bottom walls of the housing 2ª.

The truck frame has rearward extensions 2ᵇ, preferably converging toward the center and joining to form a bearing 2ᶜ, which is a point of attachment of the truck to the frame of the locomotive. The frame 2 is pivotally secured to the cross tie bar 7 of the engine frame by the double-shouldered radius bar pin 6, which seats in the bearing 2ᶜ and is held in position in registering apertures in the bar 7 and the tie bar clip 7ª. The bearing 2ᶜ preferably has a spherical face 2ᵈ which works against the cylindrical surface of the pin 6 and provides a sufficient amount of angularity between truck and locomotive frames to permit the truck to accommodate itself to the rise and fall caused by varying track conditions without imposing a bending moment on the connection.

A cross equalizer 8 is connected at its ends to the front spring hangers 9 of the springs 10 of the front driving axle. A vertical hanger 11 is carried at the center of the equalizer 8, to the lower end of which is hung the rear end 12ª of a centrally-located, longitudinally-disposed equalizer 12, which is pivoted to the under side of the cylinder saddles at 12ᵇ to secure the proper distribution of weight on the drivers and the truck.

The forward end of the equalizer 12 is supported by the hanger 13, which depends from a semi-elliptic truck spring 14, the center of which is located directly above the center of the truck axle, and the front hanger 15 connects the front end of the spring 14 to the front deck casting 16, which is rigid with the locomotive frame. To provide for a sufficient amount of flexibility the gib type of fastening is used for the hangers 13 and 15.

For maintaining the truck in central position and at the same time effecting the proper amount of lateral resistance, I provide a lower bearing member 17, which is rigid with the truck, and has on its upper face roller seats 17ª, and an upper or spring bearing member 20, which has on its under side the upper roller seats 20ª. Each seat has oppositely inclined planes of suitable incline to produce the desired amount of lateral resistance, on which are formed toothed racks with which the toothed rollers 18 mesh. The rollers 18 are spaced and guided in their seats by the frame 19.

The member 20 has at its upper end a seat 20ᵇ for the spring 14, and below the seat 20ᵇ a spherical recess 20ᶜ in the truck center line for reception of the ball joint ring 21ª, which is interposed between the recess and the adjacent end of the connecting link 21. The opposite end 21ᵇ of the link 21 is forked and the ends of the fork are pivoted by the pin 22 to a collar 23 which is rotatably suspended on the bolt 24 from the locomotive frame. This construction permits the upper bearing member to rotate with the truck about the ball joint 21ᵃ of the link 21, while the link is free to move on a horizontal radius about the bolt 24 and vertically about the pin 22, and at the same time limits the transverse movement of the member 20 relative to the locomotive frame.

To keep the upper and lower roller seats 17ᵃ and 20ᵃ in proper relation to each other and to the rollers 18, the stops 25, which limit the lateral movement of the truck, are provided with lugs 25ᵃ, which overlap portions of the member 20 and are so designed that even in event of derailment the member 20 can not become disengaged from the member 17.

As a further safety provision the truck frame has a projection 2ᵉ which extends rearwardly from the main portion of the frame a distance sufficient to underlie the forward end of the equalizer 12, so that in event of breakage of the hanger 13 it will support the forward end of the equalizer.

It will thus be seen that my improved construction has the following advantages: that the transverse member of the truck frame is located directly above the truck axle and is utilized as a weight carrying beam supported directly from the truck axle, which also forms housing for the journal bearings; that the rear end connection of the truck with the frame is in the form of a spherical bearing which is adequate to take care of angularities caused by track irregularities; that the forward end of the engine frame is supported on a semi-elliptical spring mounted directly above the longitudinal center of the truck axle so as to provide, with centering and lateral resistance means, adequate flexibility to permit the truck to assume freely the desired angularly deflected positions relative to the locomotive frame.

The invention claimed, and which it is desired to secure by Letters Patent is:

1. In a two-wheeled locomotive truck, the combination of an axle; a truck frame having bearings on the axle inside the wheels; lateral resistance mechanism mounted on the frame in the vertical plane of the axle; and a spring suspension supported through said lateral resistance mechanism and having a bearing in the longitudinal center line of the truck.

2. In a two-wheeled locomotive truck, the combination of an engine frame; a truck axle; a truck frame, having a pivotal connection with the engine frame; journal housings in the truck frame engaging the axle inside the wheels and forming with the pivotal connection a three point suspension for the truck frame; a spring suspension for the engine frame; a support for the spring suspension located in the vertical plane of the truck axle; and a universal guiding connection between the engine frame and the spring suspension.

3. In a two-wheeled locomotive truck, the combination of an engine frame; a driving axle supporting said engine frame; a truck frame; coacting bearing surfaces rotatable respectively with the engine and truck frames; spring mechanism supported by the truck frame in the longitudinal center line thereof; an equalizing member adapted to receive a portion of the load from said driving axle and transmit it to said truck frame; and means for maintaining alignment of the said bearing surfaces throughout the range of lateral movement of the truck.

4. In a two-wheeled locomotive truck, the combination of an engine frame; a truck axle; a truck frame; lateral gravity resistance and centering means mounted on the truck frame in the vertical axial plane of the axle; and a load carrying spring in the longitudinal center line of the truck mounted on the said means.

JAMES G. BLUNT.